US006426031B1

(12) United States Patent
Hayes, Jr.

(10) Patent No.: US 6,426,031 B1
(45) Date of Patent: Jul. 30, 2002

(54) METHODS OF FABRICATING A SWEEP ELBOW TUBE CONNECTOR

(76) Inventor: Frank F. Hayes, Jr., 1712-M Newport Cir., Santa Ana, CA (US) 92705

( * ) Notice: Subject to any disclaimer, the term of this patent is extended or adjusted under 35 U.S.C. 154(b) by 27 days.

(21) Appl. No.: 09/614,816

(22) Filed: Jul. 12, 2000

Related U.S. Application Data

(62) Division of application No. 09/112,405, filed on Jul. 8, 1998, now Pat. No. 6,164,706.

(51) Int. Cl.⁷ ............................................... B29C 45/44
(52) U.S. Cl. ..................... 264/318; 264/318; 264/328.1; 264/334; 425/DIG. 58; 249/144
(58) Field of Search ............................ 264/318, 328.1, 264/334, 336; 425/DIG. 58; 249/64, 144, 145

(56) References Cited

U.S. PATENT DOCUMENTS

| 1,450,606 A | | 4/1923 | Paine .......................... 285/179 |
| 2,785,910 A | | 3/1957 | Munger ....................... 285/179 |
| 3,028,630 A | * | 4/1962 | Walker ..................... 264/328.1 |
| 3,540,223 A | | 11/1970 | Ebbe ........................... 285/179 |
| 3,746,493 A | * | 7/1973 | Stalter ......................... 249/144 |
| 3,930,777 A | * | 1/1976 | Ramsey ....................... 425/190 |
| 4,050,667 A | * | 9/1977 | Kossett ....................... 249/144 |
| 4,753,413 A | * | 6/1988 | Haigh ......................... 249/122 |
| 4,765,938 A | * | 8/1988 | Schmidt et al. ............. 249/144 |
| 4,796,926 A | | 1/1989 | Rapsilver .................... 285/179 |
| 5,225,215 A | * | 7/1993 | Syvrud ......................... 249/63 |
| 5,882,042 A | | 3/1999 | Lacoste ....................... 285/179 |

FOREIGN PATENT DOCUMENTS

| AT | 259848 | 2/1968 | ................. 285/179 |
| GB | 2054778 | 2/1981 | ................. 285/179 |
| IT | 543075 | 6/1957 | ................. 285/179 |
| JP | 1-238795 | 9/1989 | ................. 285/179 |
| JP | 6-50481 | 2/1994 | |

OTHER PUBLICATIONS

Data Sheet (1 page), Fluoroware, Inc., 8/94, page 2.21, re Flaretech PFA Union Reducer Tee, "Spacesaver" Branch Tee and "Spacesaver" Union Tee.

* cited by examiner

*Primary Examiner*—Jill L. Heitbrink
(74) *Attorney, Agent, or Firm*—Larry K. Roberts

(57) ABSTRACT

A molded sweep elbow tube connector includes a molded tube connector member comprising a first linear tube end portion, a second linear tube end portion, and a curved sweep tube portion defined by a relatively large sweep radius and joining the two end portions to form an integral one-piece molded part. The tube connector member forms an interior passageway for carrying a flow of fluid, characterized by a sweep bend between the two end portions, permitting fluid laminar flow through the tube connector. The tube connector member has a thick wall thickness over at least a portion of the curved sweep tube portion and a thin wall thickness over the first linear tube end. The thin wall thickness facilitates the removal of a curved core pin from the part through a linear tube end portion after injection molding, since the plastic material will flex enough to permit the pin to be stripped without damaging the part. The tube connector has a first connector structure at the first tube end portion, and a second connector structure at the second tube end portion. Exemplary connector structures include male and female flare connectors, and male pipe thread connectors.

22 Claims, 12 Drawing Sheets

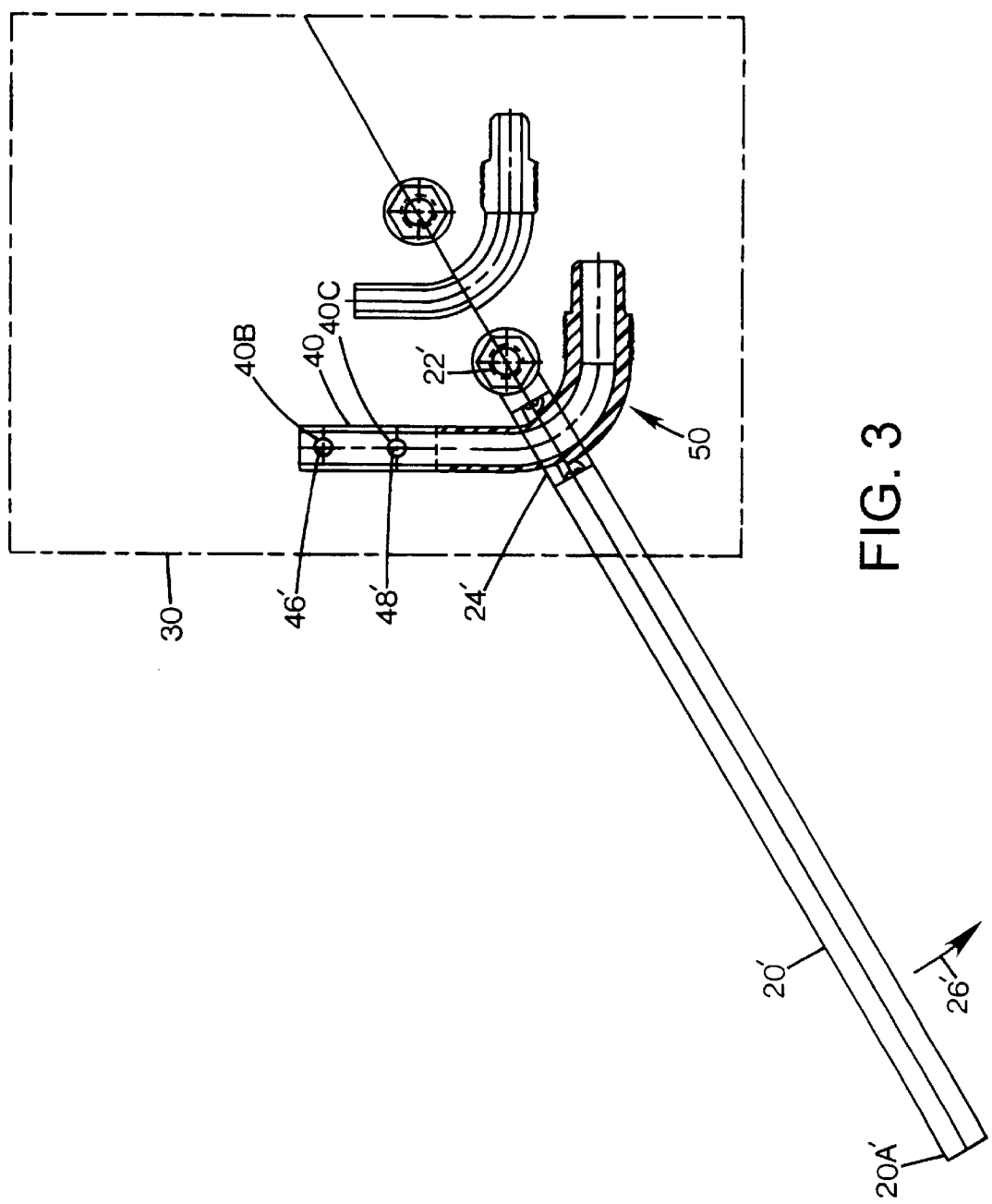

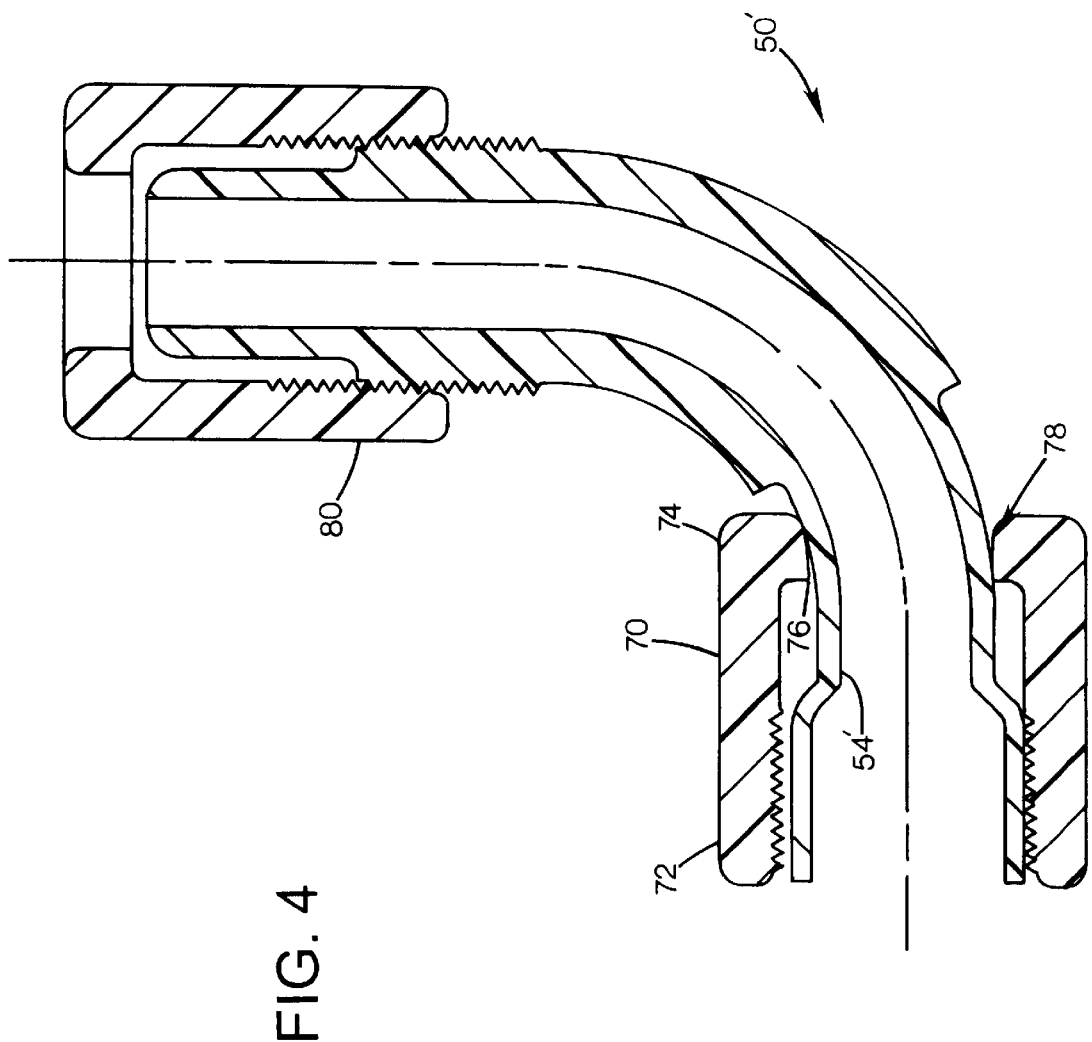

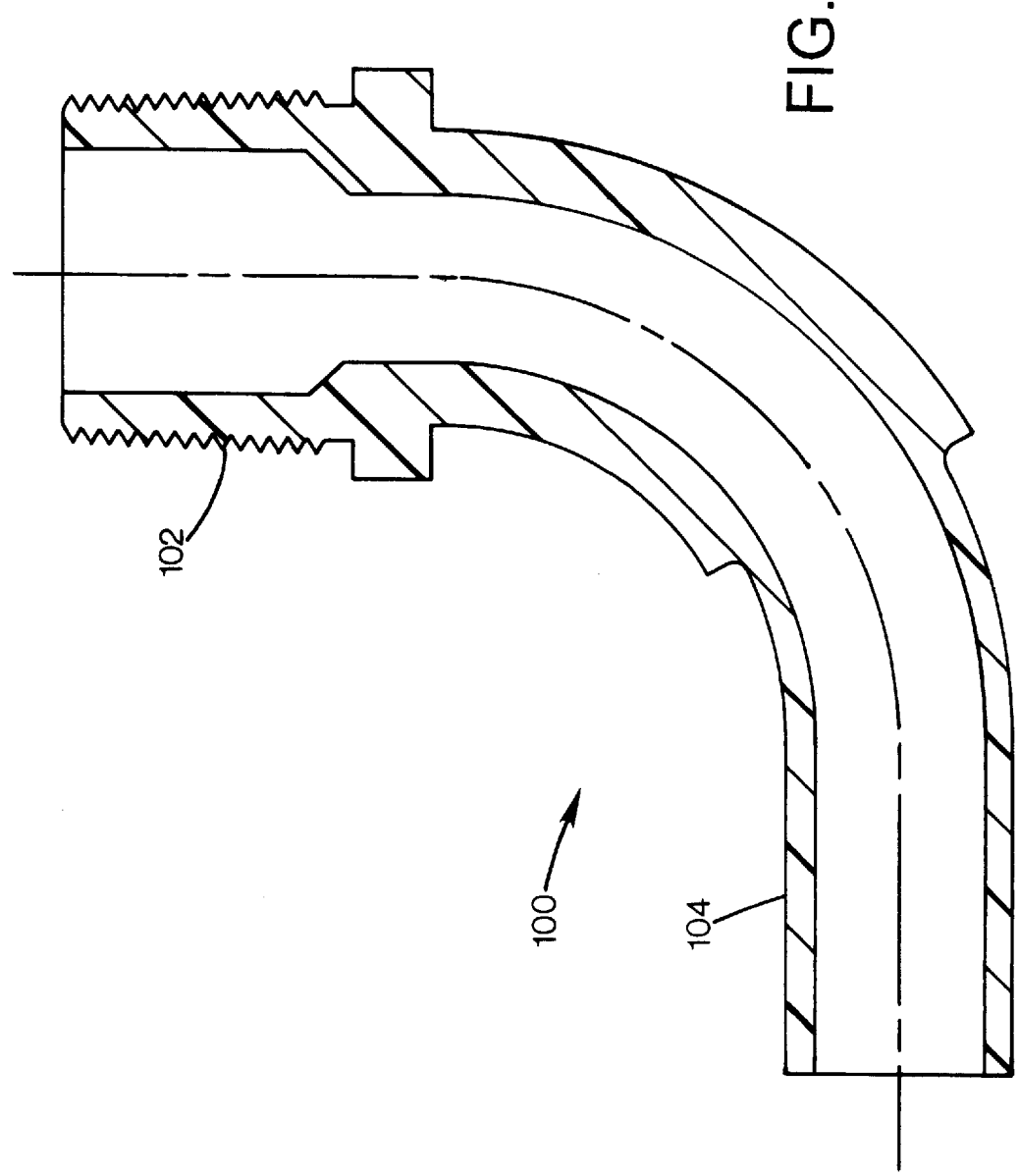

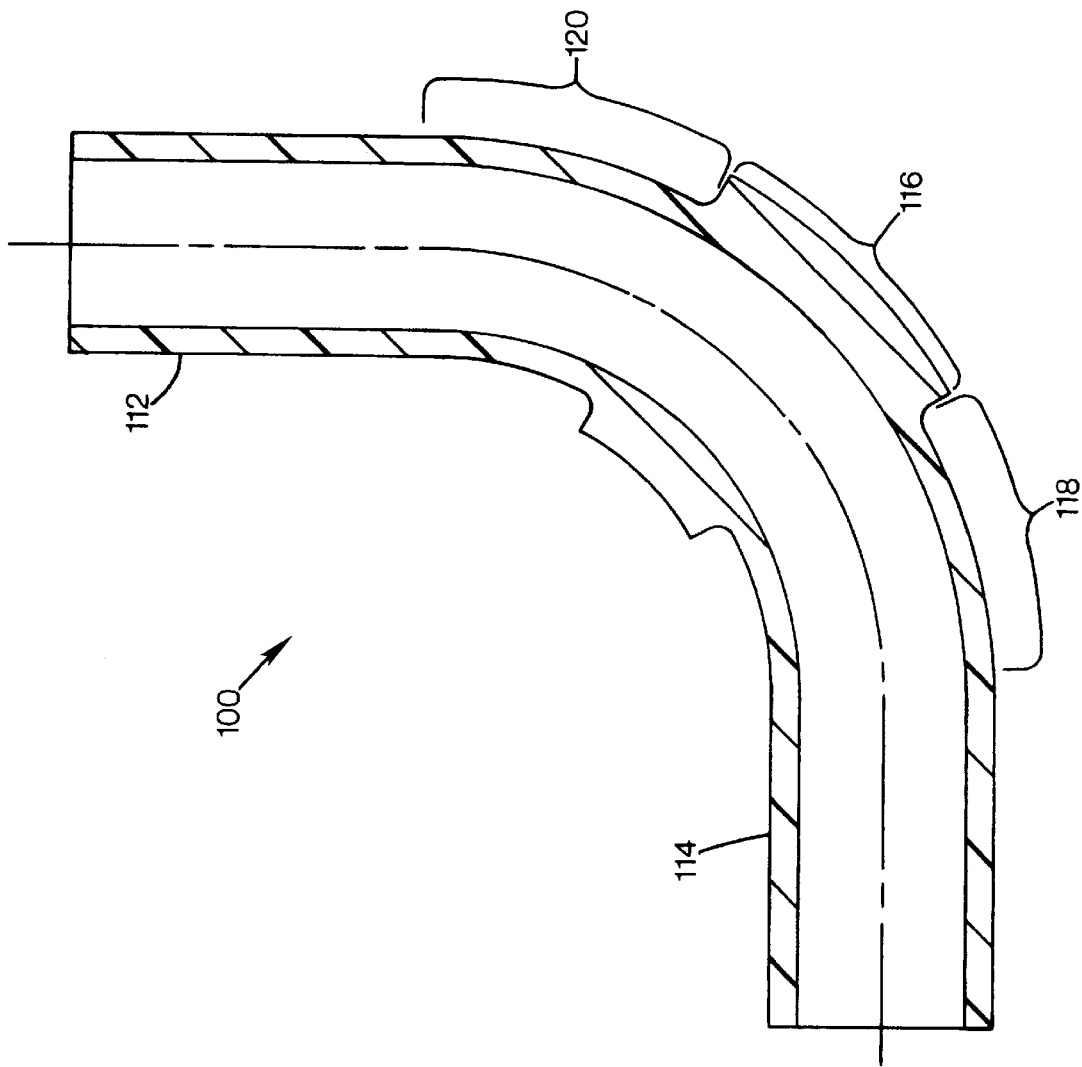

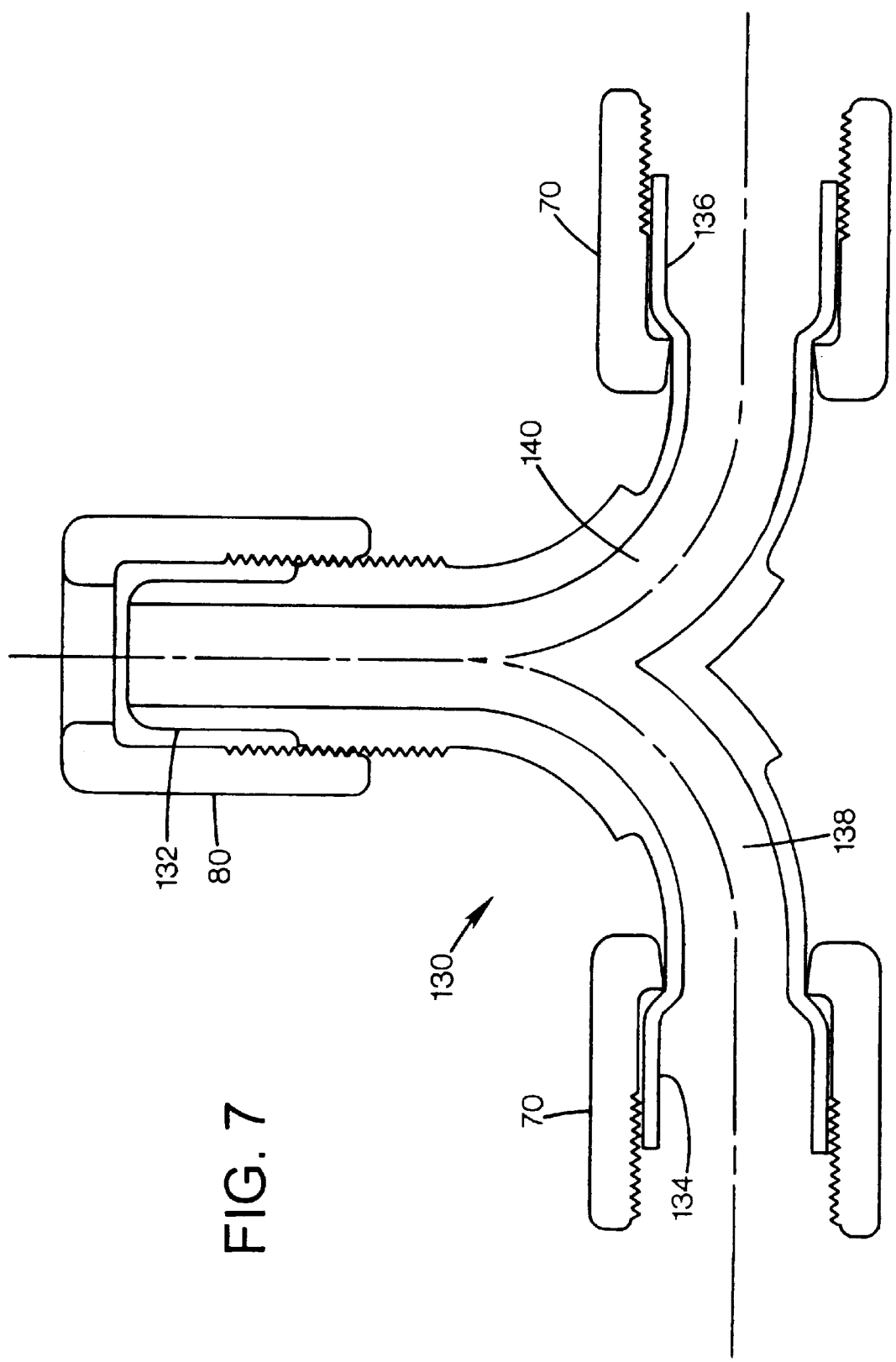

METHODS OF FABRICATING A SWEEP ELBOW TUBE CONNECTOR

CROSS-REFERENCE TO RELATED APPLICATION

This application is a division of application Ser. No. 09/112,405, filed Jul. 8, 1998, now U.S. Pat. No. 6,164,706.

TECHNICAL FIELD OF THE INVENTION

This invention relates to the field of tube connectors, and more particularly to a sweep elbow tube connector and technique for fabrication.

BACKGROUND OF THE INVENTION

Tube connectors fabricated by injection molding techniques are in common use. One type of connector is a 90 degree connector, which provides a sharp 90 degree angle transition, and can be fabricated by use of two core pins with a mold. With the core pins oriented at a 90 degree angle relative to each other, and arranged relative to a mold, the connector is readily fabricated by injecting the molten material into the mold, and thereafter withdrawing the core pins applying an extraction force on the pins along the pin axis. A compact connector can be fabricated in this way.

A problem with this known type of connector is due to the right angle junction of the tube connector. This results in poor laminar flow of a fluid passing through the connector. For some applications involving viscous fluids passing through the connector, this can lead to build-up of the fluid in the corner of the tube connector, and significant pressure drops through the connector. A right angle connector provides the greatest pressure drop of any tubing connector in common use. Since equipment using the connector typically uses many connectors in a complex arrangement, this can lead to significant down time and expense in removing the 90 degree connectors and cleaning the unwanted deposits.

It would therefor represent an advance in the art to provide an improved 90 degree tube connector which is not susceptible to fluid build-up and deposits.

It would further be advantageous to provide a tube connector which does not require frequent removal and cleaning.

SUMMARY OF THE INVENTION

A molded sweep elbow tube connector is described, and includes a molded tube connector member comprising a first linear tube end portion, a second linear tube end portion, and a curved sweep tube portion defined by a relatively large sweep radius and joining the two end portions to form an integral one-piece molded part. The tube connector member forms an interior passageway for carrying a flow of fluid, characterized by a sweep bend between the two end portions, permitting fluid laminar flow through the tube connector. The tube connector member has a thick wall thickness over at least a portion of the curved sweep tube portion and a thin wall thickness over the first linear tube end. The thin wall thickness facilitates the removal of a curved core pin from the part through a linear tube end portion after injection molding, since the plastic material will flex enough to permit the pin to be stripped without damaging the part.

The tube connector has a first connector structure at the first tube end portion, and a second connector structure at the second tube end portion. Exemplary connector structures include male and female flare connectors, and male pipe thread connectors.

In accordance with another aspect of the invention, a method of fabricating a sweep elbow tube connector is described, comprising the steps of:

providing an injection mold structure defining exterior features of a tube connector member comprising a first linear tube end portion, a second linear tube end portion, and a curved sweep tube portion defined by a relatively large sweep radius, the mold structure including a curved first core pin for defining an interior passageway portion of the tube connector member in the curved sweep tube portion and of the first linear tube end portion, and a straight second core pin for defining an interior passageway portion of the tube connector member in the second linear tube end portion;

injecting a molten plastic material in a cavity formed in the mold structure to form the tube connector, wherein the tube connector member has a thick wall thickness over at least a portion of the curved sweep tube portion and a thin wall thickness over the first linear tube end;

removing the second core pin from the mold structure;

after the plastic material has hardened to form a solid part, removing the solid part from the mold structure with the first core pin still in place in the solid part; and stripping the first core pin from the solid part by effecting relative movement therebetween, the solid plastic material forming the first linear tube end flexing to allow withdrawal of the curved core pin.

BRIEF DESCRIPTION OF THE DRAWING

These and other features and advantages of the present invention will become more apparent from the following detailed description of an exemplary embodiment thereof, as illustrated in the accompanying drawings, in which:

FIG. 3 is a diagrammatic view illustrating an alternate technique for stripping a sweep elbow part off the mold core pin after the part has been formed.

FIG. 4 illustrates the tube connector member after a secondary fabrication process has been completed, to form a sweep elbow connector having a female flare connector end portion with a threaded nut formed thereon.

FIGS. 5A–5B illustrate a sweep elbow connector part in accordance with the invention, in which a female flare connector end is employed with a tapered pipe thread (NPT) male connector portion. FIG. 5A shows the part after the primary molding fabrication process, and FIG. 5B shows the part after a secondary fabrication process to form the female flare connector end, and with a large taper relief nut in place.

FIGS. 6A–6B illustrate a sweep elbow union connector part in which female flare connector ends are employed at both ends of the connector. FIG. 6A shows the part after the primary molding fabrication process with straight extension end portions; and FIG. 6B shows the part after the secondary fabrication process to form the female flare connector ends and with large taper relief nuts in place on each connector end.

FIG. 7 illustrates a sweep tee connector embodying the invention, including three connector portions, a male flare connector portion, and respective female flare connector portions.

DETAILED DESCRIPTION OF THE PREFERRED EMBODIMENTS

Figure 1:
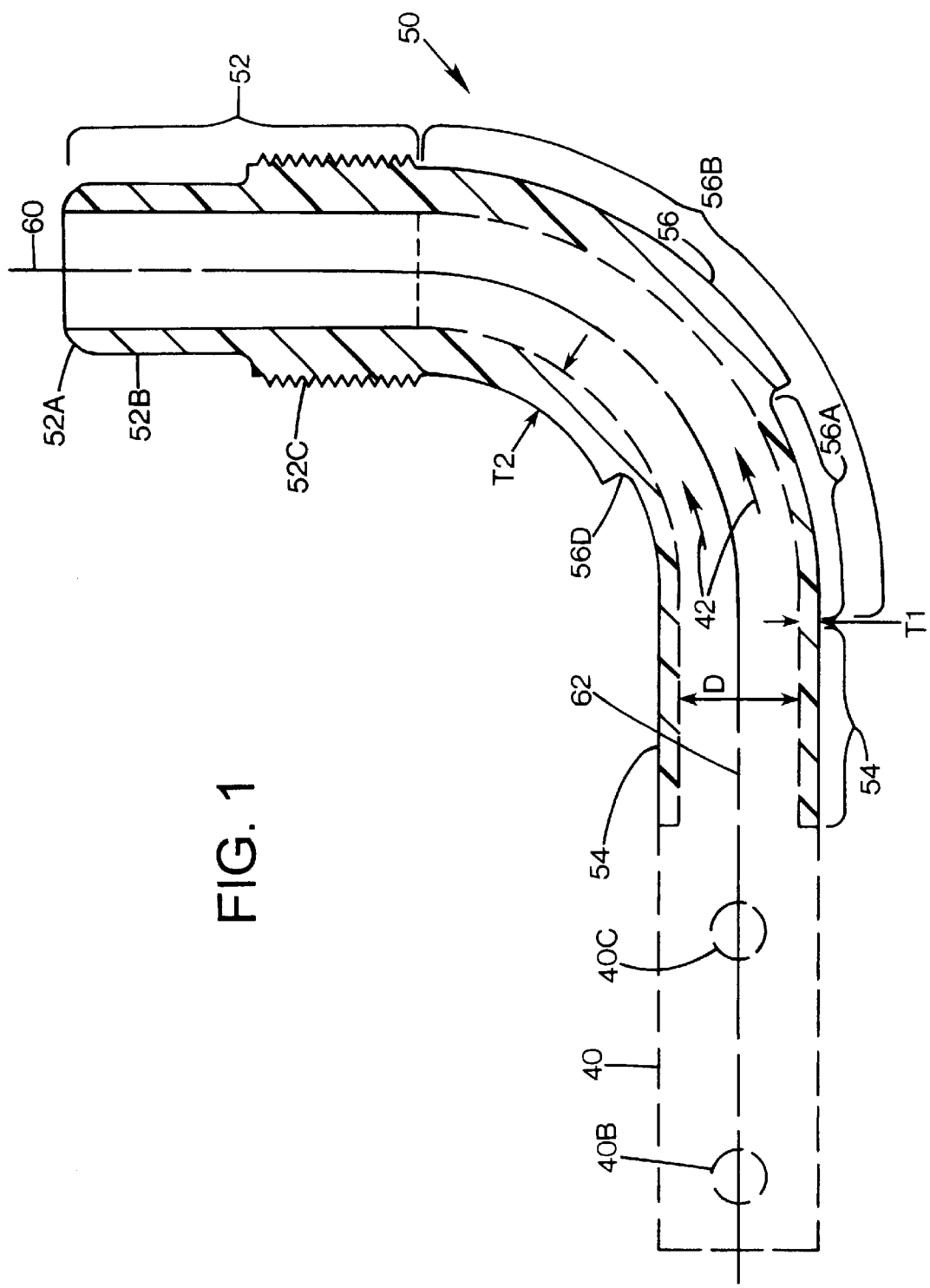
FIG. 1 is a longitudinal cross-sectional view of a 90 degree sweep elbow tube connector embodying the invention.

A 90 degree sweep elbow tube connector 50 embodying the invention is illustrated in the longitudinal cross-sectional view of FIG. 1. The connector has a first end portion 52 with a first tube axis 60, and a second end portion 54 with a second tube axis 62. The two axes are disposed at a 90 degree angle. The two end portions are joined by a curved sweep tube portion 56, to form an integral one-piece molded part. The part is characterized by a sweep bend between the two end portions, with a relatively large bend radius. The bend radius is at equal the inner diameter of the sweep elbow part, and in an exemplary embodiment is two to three times this inner diameter. This permits smooth fluid laminar flow through the tube connector, resulting in less pressure drop through the part than through a right angle connector. In a complex tubing system, such as used in chemical or pharmaceutical applications, this reduction in pressure drops across the tube connectors results in improved throughput and more consistent processing, since a relatively constant fluid pressure can be provided across the system. The smooth laminar flow minimizes collection of deposits in the elbow. The laminar flow is improved as the sweep radius is increased. Increasing the sweep radius also makes the part easier to mold, but increases the footprint of the part.

Each tube end has sufficient linear length to provide a connection to a corresponding tube component. Thus, the end portions 52, 54 are linear portions extending well beyond the respective end portions of the curved portion 56.

The connector 50 is an injection molded part, fabricated of a plastic material. A difficulty in fabrication of the sweep elbow using two core pins forming the connector ends is the removal of the core pins from the molded part. In accordance with one aspect of the invention, the end portion 54 and a portion 56A of the curved portion 56 is fabricated with a relatively thin wall construction in relation to the wall thickness of the end portion 52 and the remaining portion 56B of the curved portion 56. Thus, the end portion 54 and the thin walled portion 56A of the curved portion 56 have a wall thickness T1, and the portion 56B of the curved portion 56 has a wall thickness T2, where T2 is larger than T1. This is accomplished while maintaining a constant inner diameter D of the tube connector throughout its length, thereby preventing discontinuities which would disrupt the flow characteristics of a fluid through the tube.

The purpose of providing the end 54 and portion 56A with a reduced wall thickness T1 is to facilitate removal of the core pin 40 shown in phantom in FIG. 1, with the inner end 40A disposed within the part to the junction between the sweep portion 56 and the first end 52. The first end is defined by a second core pin which is not shown in FIG. 1, but is a linear pin, which can be removed from the molded part by an axially directed linear force. The core pin 40 is mounted in a fixture (not shown in FIG. 1) by the two locate holes 40B, 40C receiving locate pins (not shown). Then, a lever arm engages the thick shoulder area 56D, and is actuated to strip the part 50 off the core pin 40 in the direction of the arrows 42. Because of the reduced thickness of the wall of the tube in region 56A, the wall portion will bend or flex as the part is removed from the core pin, without damage to the part.

Figure 2:
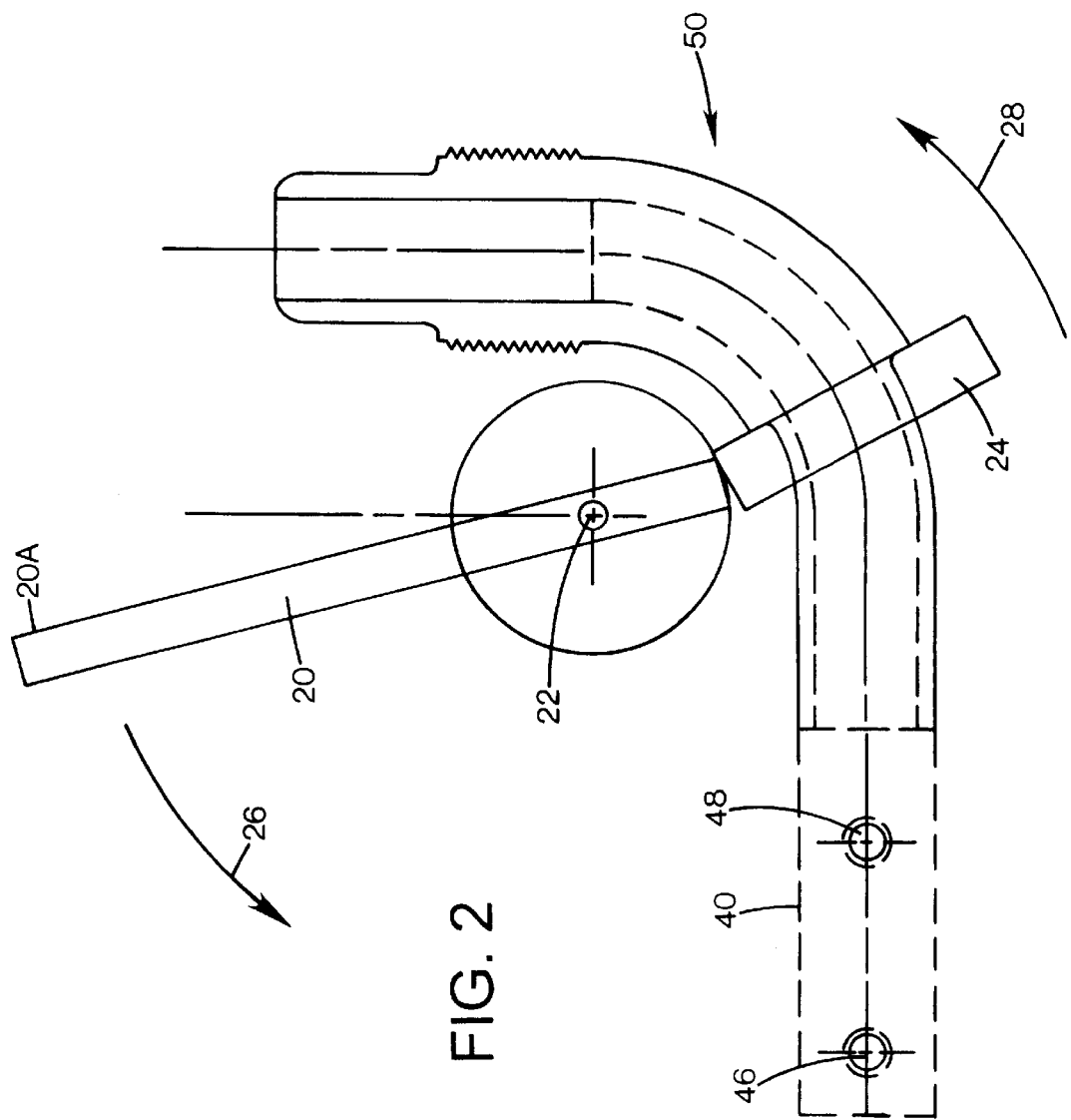
FIG. 2 is a diagrammatic view illustrating one exemplary technique for stripping a sweep elbow part off the mold core pin after the part has been formed.

FIG. 2 illustrates one exemplary technique for stripping the part 50 off the core pin 40 after the part has been formed in a mold. The pin 40 is secured in a fixture by two fixture pins 46, 48 which extend through the locate holes 40B, 40C formed in the core pin 40. A lever 20 is mounted for pivotal movement about a pivot point 22, located at the center of the sweep radius of the sweep portion 56. A clam shell type bracket 24 closes about the thin walled portion 56A of the sweep portion 56, and has an opening size which is smaller than the outer diameter of the part 50 at the thick walled portion 56B. The bracket 24 is therefore stopped against the shoulder 56D. With the pin 40 fixed in position by the locate pins 46, 48, the lever is rotated about the pivot point 22, so that end 20A rotates in the direction of arrow 26, and the bracket 24 moves in the direction of arrow 28. This applies a rotating force on the part 50 which strips the part from the core pin. Even though the end 54 is not curved but is linear, and the pin 40 has a curved portion over which the linear end must move, the linear portion can still pass over the curved pin since the thin wall of the linear portion will give or flex. Also, stripping the part from the core pin shortly after it has been molded, and before the plastic material has completely cooled, facilitates the pin removal, since the freshly molded material is more flexible that after fully cooling.

FIG. 3 illustrates an alternate technique for stripping the part 50 off the core pin 40 after the part has been formed in a mold. The pin 40 is secured in the fixture indicated generally by phantom line 30 by two fixture pins 46, 48 which extend through the locate holes 40B, 40C formed in the core pin 40. A lever 20' is mounted for pivotal movement about a pivot point 22', located at the center of the sweep radius of the sweep portion 56. A clam shell type bracket 24' closes about the thin walled portion 56A of the sweep portion 56, and has an opening size which is smaller than the outer diameter of the part 50 at the thick walled portion 56B. The bracket 24 is therefore stopped against the shoulder 56D. With the pin 40 fixed in position by the locate pins 46, 48, the lever is rotated about the pivot point 22, so that end 20A' rotates in the direction of arrow 26', moving the part 50 in the same direction. This applies a rotating force on the part 50 which strips the part from the core pin. Even though the end 54 is not curved but is linear, and the pin 40 has a curved portion over which the linear end must move, the linear portion can still pass over the curved pin since the thin wall of the linear portion of the part will give or flex. This embodiment of the stripping apparatus employs a pivot point 22' located such that the part 50 is between the pivot and the distal end 20A' of the lever arm 20'.

The part 50 illustrated in FIGS. 1–3 has a male flare connector end portion 52. The second connector end portion 54 is a straight extension portion 54. The part 50 is shown in FIGS. 1–3 in the configuration resulting from the primary fabrication process, i.e. the injection molding process. The male flare end portion 52 in this exemplary embodiment is molded with the tapered end 52A, the straight extension portion 52B and the threaded portion 52C. The second connector end portion 54 can be farther processed, by a secondary fabrication process, to form a female flare connector end. The secondary fabrication process is conventional, e.g. a hot flare process, wherein the thin wall extension portion 54 is heated, e.g. by placement of a heat source about the portion 54, and the plastic material softened. A threaded nut is then positioned on the extension portion 54 toward the curved portion, and a mandrel in the shape of the male connector portion which is to mate with the female flare portion is then pressed into the heated end portion. The mandrel forms the softened material into the shape of the female flare portion while it cools. FIG. 4 illustrates the part after this secondary fabrication process has been completed, to form a sweep elbow connector 50' having a female flare connector end portion 54' with a threaded nut 74 formed thereon.

FIG. 4 illustrates a further aspect of the invention. The nut has a threaded end 72 for engaging the threaded portion of a male flare connector, e.g. of the type fabricated as male end portion 52 of the part 50'. The opposite end 74 of the nut has an opening 76 sized to fit over the thin wall extension portion 54 of the part but smaller than the diameter of the flare end portion 54', and is thus captured on the part 50. In order to properly engage with the threaded portion of the male connector, the nut 70 should be withdrawn until the edge of the threaded end 72 is about aligned with the end of the female connector portion. To allow the nut to be withdrawn on the thin wall portion of the part to this extent, a large taper relief 78 is formed in the opening 76. This enlarges the opening end to allow the nut to slide onto the curved portion of the sweep elbow, yet does not enlarge the opening to an extent that the nut can be withdrawn over the flared end. The nut 70 can thus still perform the function of drawing the male connector end tightly against the female flare connector. The nut 70 is preferably fabricated of a rigid plastic material such as polyvinylildene fluoride (PVDF), although for some applications, e.g. high temperature applications, the nut can be fabricated of the same resilient material as used to form the tube connector member.

As further shown in FIG. 4, a threaded nut 80 will engage the threaded portion of the male connector end 52.

The part 50 is fabricated of a plastic material which is resilient enough to flex during the core pin stripping process to allow removal of the curved core pin without fracturing or damaging the part. In an exemplary embodiment, the part 50 is fabricated of perfluoroalkoxy (PFA), a melt-processable TEFLON (™), a resilient material with a low coefficient of drag. This material has sufficient resiliency to bend or give as the part is removed from the curved core pin without fracturing or damaging the part.

In an exemplary implementation, the part 50 for a ½ inch sweep elbow union has a tube inner diameter of 0.375 inch, and a sweep radius of 1 inch. The thin wall thickness T1 is 0.06 inch, and the thick wall thickness T2 is 0.15 inch. For this exemplary embodiment of a ½ inch sweep elbow part, the thin wall portion 56A of the sweep portion 56 extends over a 30 degree arc about the center of curvature of the sweep portion, and the straight extension of the thin wall extends for 0.79 inch, and preferably for a length of two to three times the inner diameter of the sweep elbow part. The male connector end portion has a length of 1.145 inches. The portion 52B has a length of 0.59 inch, and a thickness of 0.090 inch. The threaded portion 52C has a length of 0.52 inch. Of course these dimensions are merely illustrative, and parts of other dimensions and materials can also be fabricated in accordance with the invention.

Figure 5B:
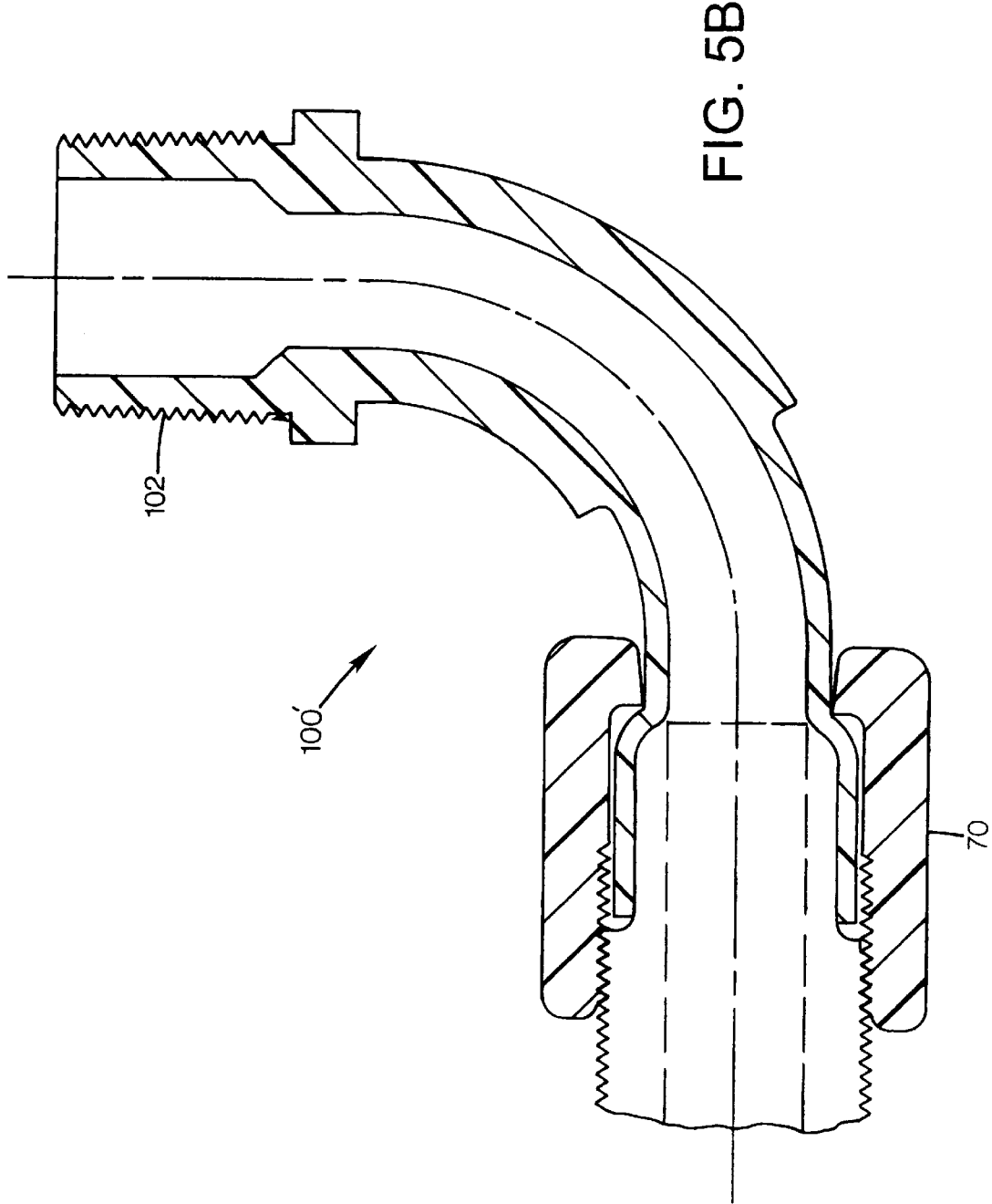

Other exemplary embodiments of sweep tube connectors in accordance with the invention are illustrated in FIGS. 5A–8. FIGS. 5A–5B illustrate a sweep elbow connector part 100 in which a female flare connector end 104 is employed as in the part 50', but with a tapered pipe thread (NPT) male connector portion 102 instead of a male flare connector end as in the part 50/50'. FIG. 5A shows the part 100 after the primary molding fabrication process, and FIG. 5B shows the part 100' after the secondary fabrication process to form the female flare connector end, and with the large taper relief nut 70 in place.

Figure 6B:
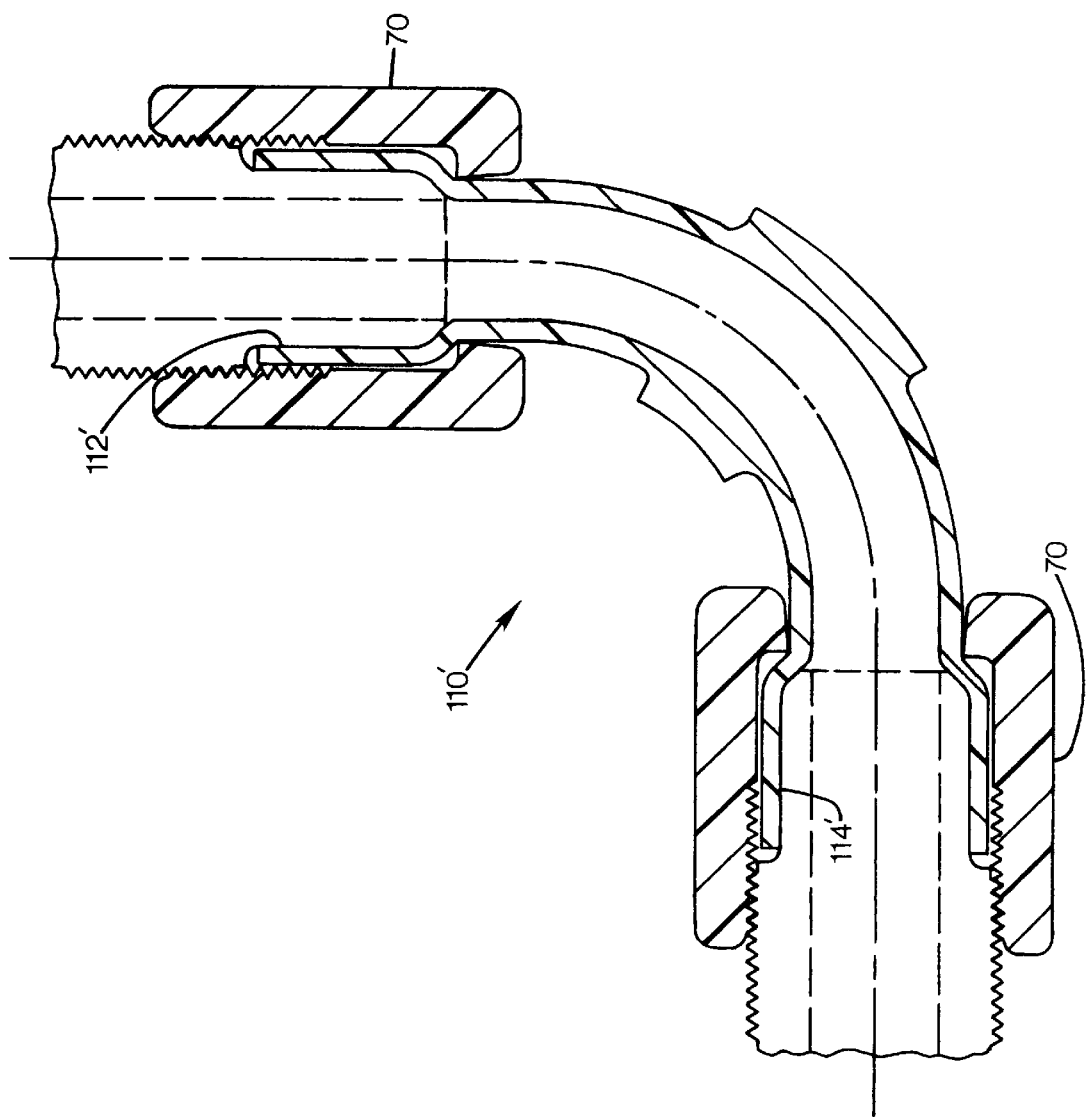

FIGS. 6A–6B illustrate a sweep elbow union connector part in which female flare connector ends are employed at both ends of the connector. Thus, the male connector end 52 of the part 50/50' is replaced with a female flare connector portion 112. FIG. 6A shows the part 110 after the primary molding fabrication process with straight extension end portions 112, 114, and FIG. 6B shows the part 110' after the secondary fabrication process to form the female flare connector ends 112', 114' and with large taper relief nuts 70 in place on each connector end. The thick wall portion 116 of the sweep portion of the part extends through a 30 degree arc about the center of curvature, with the thin wall portions 118, 120 of the sweep portions also extending through 30 degree arcs.

FIGS. 1–6 have illustrated embodiments of sweep elbow tube connector parts with two connector portions. The invention is not limited to parts with two connector portions, but can be employed in fabricated connectors having more than two connector portions. For example, FIG. 7 illustrates a three port sweep elbow part, a sweep tee connector 130, embodying the invention. This part includes three connector portions, a male flare connector portion 132, and respective female flare connector portions 134, 136. The part further includes two curved sweep regions defining sweep passageways 138, 140 which unite at the male connector 132. The female flare connector portions extend in opposite directions on an axis, with the male connector portion extending at a right angle to the axis defined by the two female connector portions. A stripping technique as described above with respect to FIG. 2 or FIG. 3 can be used to strip the curved core pins (not shown) one at a time from the respective female connector ends.

Figure 8:
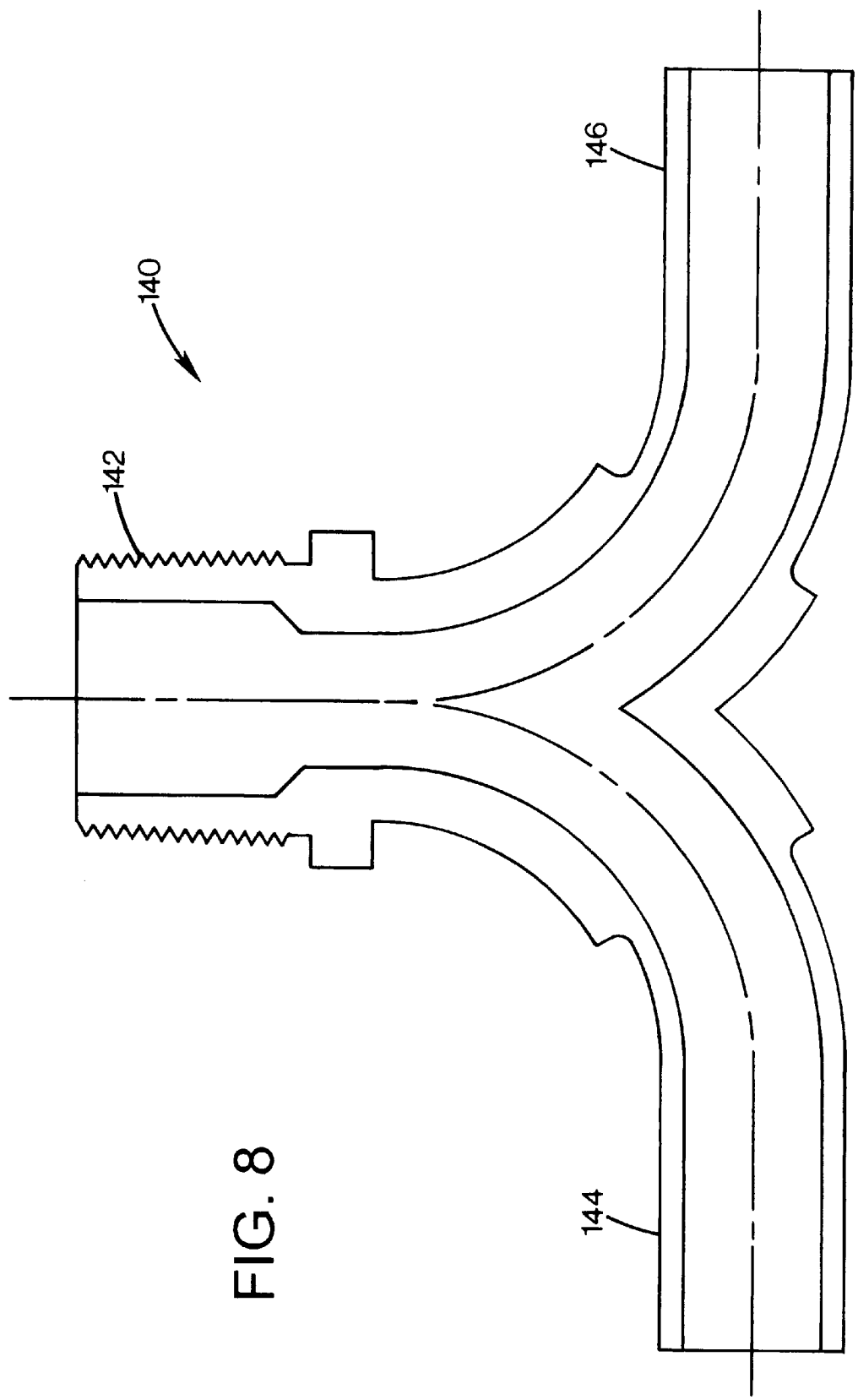
FIG. 8 shows an alternative embodiment of a sweep tee connector, having an NPT pipe thread male connector end 142.

FIG. 8 shows an alternative embodiment of a sweep tee connector 140, having an NPT pipe thread male connector end 142. The part 140 is shown in its configuration after the primary molding process, with the core pins removed. Female flare connectors will be formed by the secondary fabrication process as described above at thin wall extension ends 144, 146.

Figure 9:
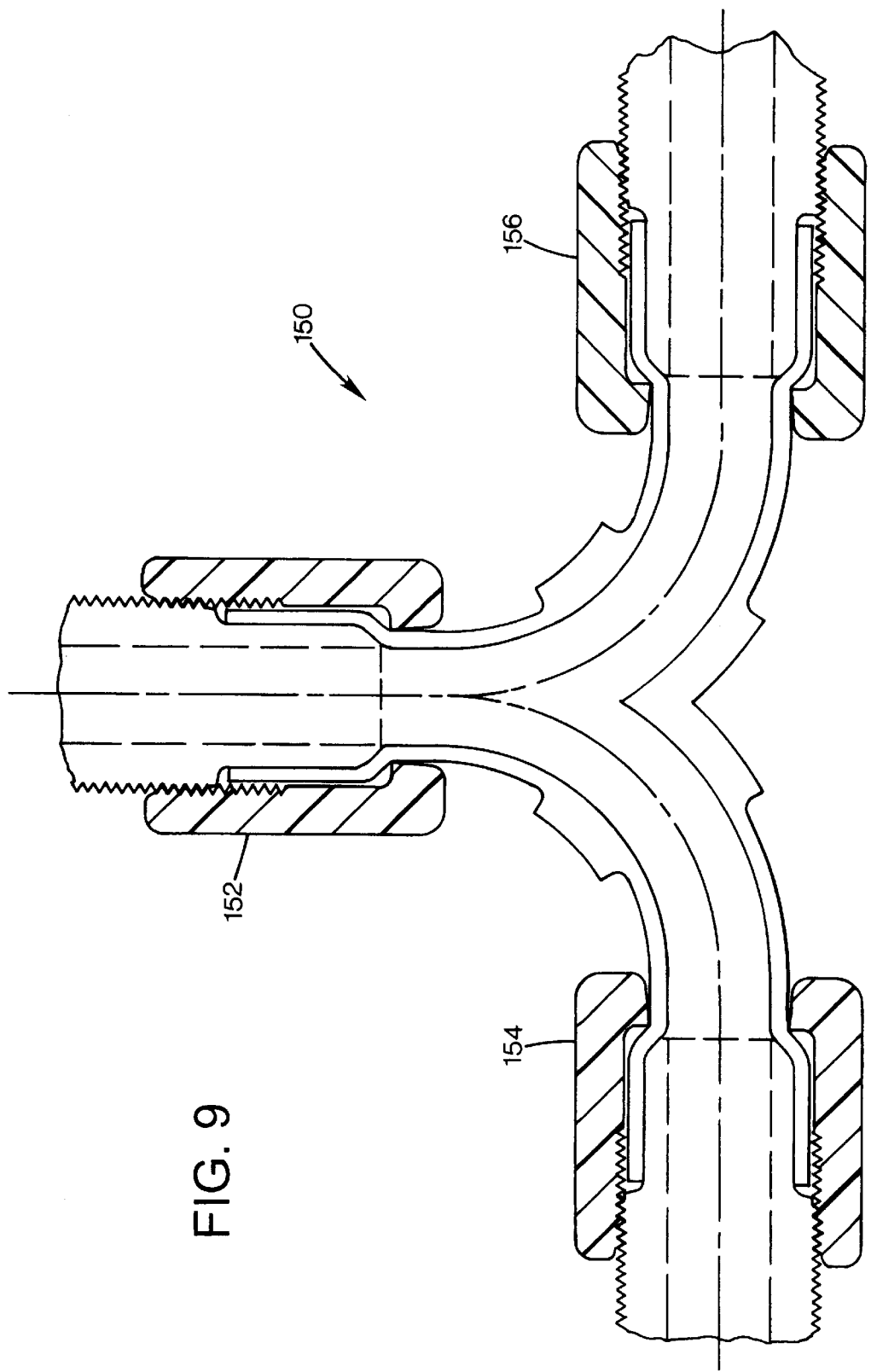
FIG. 9 shows a further alternative embodiment of a sweep tee connector having three female connectors.

FIG. 9 shows a further alternative embodiment of a sweep tee connector 150 having three female connectors 152, 154 and 156.

Figure 10:
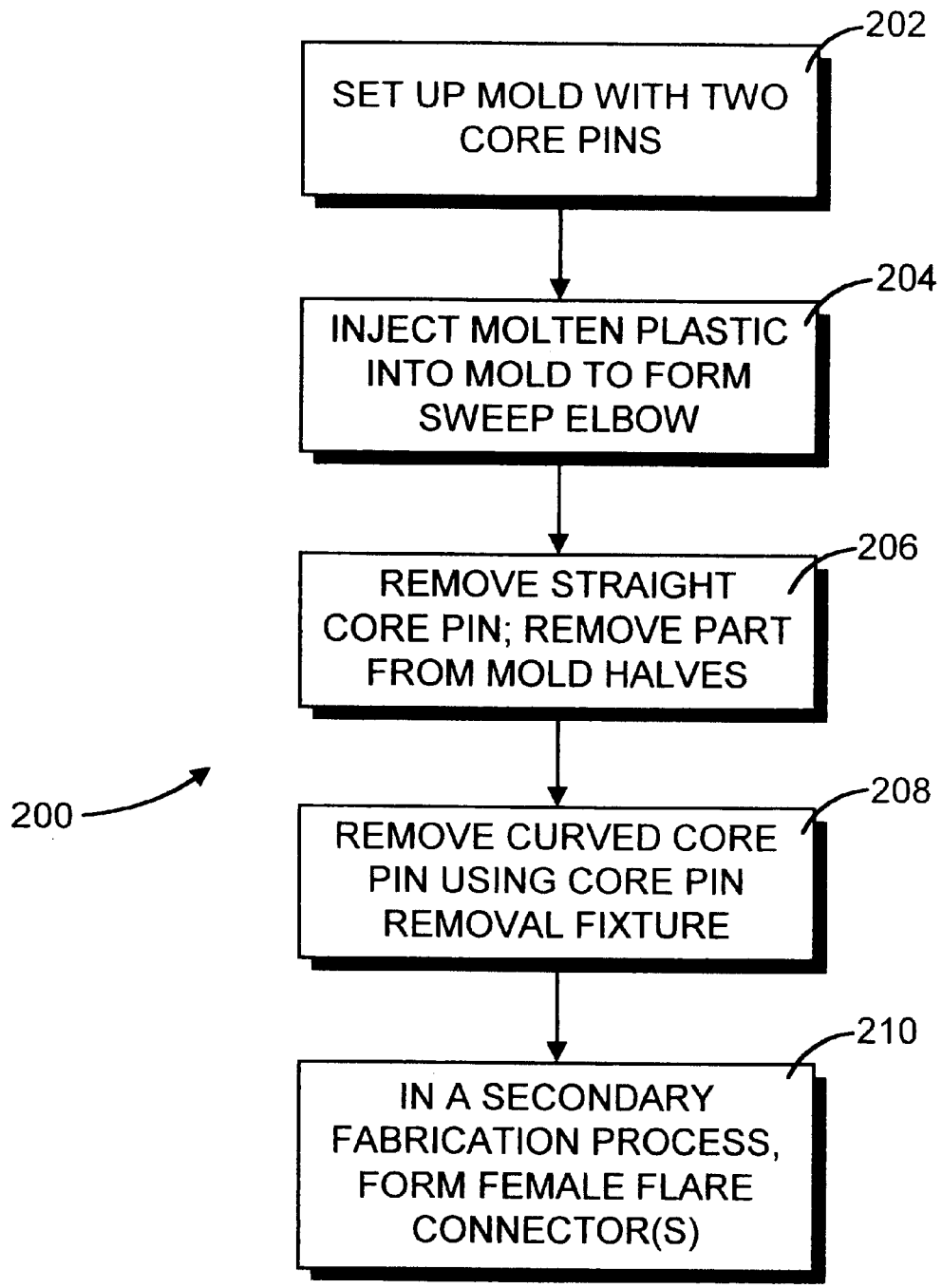
FIG. 10 is a simplified process flow diagram illustrating a technique for fabricating a sweep elbow tube connector in accordance with the invention.

A method for fabricating a sweep elbow tube connector in accordance with aspects of this invention is illustrated in the simplified flow diagram of FIG. 10. At step 202, the mold structures are set up, and will typically include a two piece mold for forming the external features of the part. The two pieces when closed together form an interior cavity. The two core pins, one straight pin and one curved pin, extend into the interior cavity through openings in the closed molds; the tips of the pins are brought into contact to define the internal passageway of the part.

At step 204, the molten plastic material is injected into the mold. After the plastic material has hardened, the straight core pin is removed, the mold halves are separated, and the part with the curved pin still in place is separated from the mold halves (step 206). The curved mold pin 40 is then removed from the part using the lever arm technique illustrated in FIG. 2 or FIG. 3 (step 208), completing the primary fabrication process.

The female flare connectors are subsequently formed in a secondary fabrication process (210), such as a hot flare process. This process includes first heating the linear end portion, then placing a large taper relief, threaded nut over the linear end portion, and then forming the female flare connector by use of a mandrel.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method of fabricating a sweep elbow tube connector, comprising the steps of:

providing an injection mold structure defining exterior features of a tube connector member comprising a first linear tube end portion, a second linear tube end portion, and a curved sweep tube portion defined by a relatively large sweep radius, the mold structure including a curved first core pin for defining an interior passageway portion of the tube connector member in the curved sweep tube portion and of the first linear tube end portion, and a straight second core pin for defining an interior passageway portion of the tube connector member in the second linear tube end portion;

injecting a molten plastic material in a cavity formed in the mold structure to form the tube connector, wherein the tube connector member has a thick wall thickness over at least a portion of said curved sweep tube portion and a thin wall thickness over said first linear tube end;

removing the second core pin from the mold structure;

after the plastic material has hardened to form a solidified part, removing the solidified part from the mold structure with the first core pin still in place in the solid part; and stripping the first core pin from the solidified part by effecting relative movement therebetween, the solid plastic material forming first linear tube end flexing to allow withdrawal of the curved core pin.

2. The method of claim 1, wherein the step of stripping the first core pin includes fixing the position of the first core pin in a stripping fixture, and applying force on the solidified part to move the part through an arc of radius equal to the sweep radius to strip the part from the pin.

3. The method of claim 1 wherein the plastic material is a resilient plastic material.

4. The method of claim 1 wherein the plastic material is perfluoro-alkoxy (PFA).

5. The method of claim 1 wherein the sweep radius is at least equal to an inner diameter dimension of said passageway.

6. The method of claim 1 wherein the sweep radius is in the range of two to three times the inner diameter dimension.

7. The method of claim 1, wherein said thin wall thickness extends over a thin wall portion of said curved sweep tube portion.

8. A method of fabricating a sweep elbow tube connector, comprising the steps of:

injecting a molten plastic material in a cavity formed in a mold structure to form a tube connector member comprising a first linear tube end portion, a second linear tube end portion, and a curved sweep tube portion defined by a relatively large sweep radius, wherein the tube connector member has a thick wall thickness over at least a portion of said curved sweep tube portion and a thin wall thickness over said first linear tube end, the mold structure including a curved first core pin for defining an interior passageway portion of the tube connector member in the curved sweep tube portion and of the first linear tube end portion, and a straight second core pin for defining an interior passageway portion of the tube connector member in the second linear tube end portion;

after the plastic material has hardened to form a solidified part, stripping the first core pin from the solidified part by effecting relative movement therebetween, the solid plastic material forming first linear tube end flexing to allow withdrawal of the curved core pin.

9. The method of claim 8, further comprising:

removing the second core pin from the mold structure.

10. The method of claim 8, further comprising:

removing the solidified part from the mold structure with the first core pin still in place in the solid part; and removing the second core pin from the mold structure.

11. The method of claim 8 wherein the step of stripping the first core pin includes fixing the position of the first core pin in a stripping fixture, and applying force on the solidified part to move the part through an arc of radius equal to the sweep radius to strip the part from the pin.

12. The method of claim 8 wherein the plastic material is a resilient plastic material.

13. The method of claim 8 wherein the plastic material is perfluoroalkoxy (PFA).

14. The method of claim 8 wherein the sweep radius is at least equal to an inner diameter dimension of said passageway.

15. The method of claim 8 wherein the sweep radius is in the range of two to three times the inner diameter dimension.

16. The method of claim 8, wherein said thin wall thickness extends over a thin wall portion of said curved sweep tube portion.

17. A method of fabricating a sweep elbow tube connector, comprising:

providing an injection mold structure defining exterior features of a tube connector member comprising a first linear tube end portion, a second linear tube end portion, and a curved sweep tube portion defined by a relatively large sweep radius, the mold structure including a curved first core pin for defining an interior passageway portion of the tube connector member in the curved sweep tube portion and of the first linear tube end portion, and a straight second core pin for defining an interior passageway portion of the tube connector member in the second linear tube end portion;

injecting a molten plastic material in a cavity formed in the mold structure to form the tube connector, wherein the tube connector member has a thick wall thickness over at least a portion of said curved sweep tube portion and a thin wall thickness over said first linear tube end;

removing the second core pin from the mold structure;

after the plastic material has hardened to form a solidified part, removing the solidified part from the mold structure with the first core pin still in place in the solid part; and stripping the first core pin from the solidified part by effecting relative movement therebetween, including engaging the part with a lever mounted bracket seating against a part shoulder defined at a junction of the thick wall portion and the thin wall portion of the part, and rotating the bracket about a center of rotation coincident with a center of curvature of the sweep tube portion of said part, the solid plastic material forming first linear tube end flexing to allow withdrawal of the curved core pin.

18. A method of fabricating a sweep elbow tube connector, comprising:

injecting a molten plastic material in a cavity formed in a mold structure to form a tube connector member comprising a first linear tube end portion, a second linear tube end portion, and a curved sweep tube portion defined by a relatively large sweep radius, wherein the tube connector member has a thick wall thickness over at least a portion of said curved sweep tube portion and a thin wall thickness over said first linear tube end, the mold structure including a curved first core pin for defining an interior passageway portion of the tube connector member in the curved sweep tube portion and of the first linear tube end portion, and a straight second core pin for defining an interior passageway portion of the tube connector member in the second linear tube end portion;

after the plastic material has hardened to form a solidified part, stripping the first core pin from the solidified part by effecting relative movement therebetween, including fixing the position of the first core pin in a stripping fixture, engaging the part with a lever mounted bracket seating against a part shoulder defined at a junction of the thick wall portion and the thin wall portion of the part, and rotating the bracket about a center of rotation coincident with a center of curvature of the sweep tube portion of said part to move the part through an arc of radius equal to the sweep radius to strip the part from the pin, the solid plastic material forming first linear tube end flexing to allow withdrawal of the curved core pin.

19. A method of fabricating a sweep elbow tube connector, comprising:

providing an injection mold structure defining exterior features of a tube connector member comprising a first linear tube end portion, a second linear tube end portion, and a curved sweep tube portion defined by a relatively large sweep radius, the mold structure including a curved first core pin for defining an interior passageway portion of the tube connector member in the curved sweep tube portion and of the first linear tube end portion, and a straight second core pin for defining an interior passageway portion of the tube connector member in the second linear tube end portion;

injecting a molten plastic material in a cavity formed in the mold structure to form the tube connector, wherein the tube connector member has a thick wall thickness over at least a portion of said curved sweep tube portion and a thin wall thickness over said first linear tube end;

removing the second core pin from the mold structure;

after the plastic material has hardened to form a solidified part, stripping the first core pin from the solidified part by effecting relative movement therebetween, including engaging and rotating a lever mounted bracket against a part shoulder defined at a junction of the thick wall portion and the thin wall portion of the part, the solid plastic material forming first linear tube end flexing to allow withdrawal of the curved core pin.

20. A method of fabricating a sweep elbow tube connector, comprising:

injecting a molten plastic material in a cavity formed in a mold structure to form a tube connector member comprising a first linear tube end portion, a second linear tube end portion, and a curved sweep tube portion defined by a relatively large sweep radius, wherein the tube connector member has a thick wall thickness over at least a portion of said curved sweep tube portion and a thin wall thickness over said first linear tube end, the mold structure including a curved first core pin for defining an interior passageway portion of the tube connector member in the curved sweep tube portion and of the first linear tube end portion, and a straight second core pin for defining an interior passageway portion of the tube connector member in the second linear tube end portion;

after the plastic material has hardened to form a solidified part, stripping the first core pin from the solidified part by effecting relative movement therebetween, including fixing the position of the first core pin in a stripping fixture, engaging the part with a lever mounted bracket seating against a part shoulder defined at a junction of the thick wall portion and the thin wall portion of the part, and rotating the bracket to strip the part from the pin, the solid plastic material forming first linear tube end flexing to allow withdrawal of the curved core pin.

21. A method of fabricating a sweep elbow tube connector, comprising:

providing an injection mold structure defining exterior features of a tube connector member comprising a first linear tube end portion, a second linear tube end portion, and a curved sweep tube portion defined by a relatively large sweep radius, the mold structure including a curved first core pin for defining an interior passageway portion of the tube connector member in the curved sweep tube portion and of the first linear tube end portion, and a straight second core pin for defining an interior passageway portion of the tube connector member in the second linear tube end portion, the first core pin and the second core pin arranged to form a right angle passageway through the tube connector;

injecting a molten plastic material in a cavity formed in the mold structure to form the tube connector, wherein the tube connector member has a thick wall thickness over at least a portion of said curved sweep tube portion and a thin wall thickness over said first linear tube end;

removing the second core pin from the mold structure;

after the plastic material has hardened to form a solidified part, removing the solidified part from the mold structure with the first core pin still in place in the solid part; and stripping the first core pin from the solidified part by effecting relative movement therebetween, the solid plastic material forming said first linear tube end flexing to allow Withdrawal of the curved core pin.

22. A method of fabricating a sweep elbow tube connector, comprising the steps of:

injecting a molten plastic material in a cavity formed in a mold structure to form a tube connector member comprising a first linear tube end portion, a second linear tube end portion, and a curved sweep tube portion defined by a relatively large sweep radius, wherein the tube connector member has a thick wall thickness over at least a portion of said curved sweep tube portion and a thin wall thickness over said first linear tube end, the mold structure including a curved first core pin for defining an interior passageway portion of the tube connector member in the curved sweep tube portion and of the first linear tube end portion, and a straight second core pin for defining an interior passageway portion of the tube connector member in the second linear tube end portion, the first core pin and the second core pin arranged to form a right angle passageway through the tube connector;

after the plastic material has hardened to form a solidified part, stripping the first core pin from the solidified part by effecting relative movement therebetween, the solid plastic material forming first linear tube end flexing to allow withdrawal of the curved core pin.

* * * * *